(12) United States Patent
Henriksen et al.

(10) Patent No.: US 10,786,961 B2
(45) Date of Patent: *Sep. 29, 2020

(54) ADJUSTING EXPANDABLE RIM WIDTH USING A BAND

(71) Applicant: BRIDGESTONE BANDAG, LLC, Muscatine, IA (US)

(72) Inventors: Eric M. Henriksen, Muscatine, IA (US); Noel K. Stineman, Grandview, IA (US); Wade L. Terrill, Letts, IA (US); Matthew S. Bartenhagen, Durant, IA (US)

(73) Assignee: Bridgestone Bangag, LLC, Muscatine, IA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/665,292

(22) Filed: Jul. 31, 2017

(65) Prior Publication Data
US 2017/0326827 A1    Nov. 16, 2017

Related U.S. Application Data

(63) Continuation of application No. 14/868,886, filed on Sep. 29, 2015, now Pat. No. 9,724,888.

(60) Provisional application No. 62/194,861, filed on Jul. 21, 2015.

(51) Int. Cl.
*B29D 30/54* (2006.01)

(52) U.S. Cl.
CPC ........ *B29D 30/54* (2013.01); *B29D 2030/541* (2013.01); *B29D 2030/549* (2013.01)

(58) Field of Classification Search
CPC .............. B29D 30/54; B29D 2030/541; B29D 2030/549

USPC .......................................................... 157/13
See application file for complete search history.

(56) References Cited

U.S. PATENT DOCUMENTS

| 2,124,345 | A | * | 7/1938 | Grange | ................... | B60B 25/04 |
| | | | | | | 152/411 |
| 2,418,584 | A | * | 4/1947 | Hawkinson | ............ | B29D 30/54 |
| | | | | | | 425/22 |
| 2,614,603 | A | | 10/1952 | Howley | | |

(Continued)

FOREIGN PATENT DOCUMENTS

FR            932102 A      3/1948

OTHER PUBLICATIONS

Simon Ltd Henry, English Abstract of FR932102A, dated Mar. 12, 1948.

*Primary Examiner* — Hadi Shakeri

(57) ABSTRACT

A rim for mounting a tire includes a base portion and a rim portion. The rim portion includes a rim segment, a first flange segment positioned on one side and a second flange segment positioned on an opposite side of the rim segment. The rim segment defines a circular curvature and has an original rim width measured along a rotation axis of the rim between inward facing surfaces of the first flange segment and the second flange segment. A band is positioned around a circumference of the rim segment contiguous with an inward facing surface of the first flange segment. The rim portion has an adjusted rim width, measured between a band inward facing surface and the inward facing surface of the second flange segment, which is different from the original rim width.

19 Claims, 9 Drawing Sheets

(56) References Cited

U.S. PATENT DOCUMENTS

| | | | | |
|---|---|---|---|---|
| 2,921,338 | A | * | 1/1960 | Glynn ................... B29D 30/54 157/1.1 |
| 2,973,791 | A | | 3/1961 | French |
| 3,331,412 | A | | 7/1967 | Sornsen |
| 3,614,969 | A | | 10/1971 | Breiner |
| 3,741,268 | A | | 6/1973 | Brewer |
| 3,770,032 | A | * | 11/1973 | Stull ....................... B60C 25/00 157/16 |
| 4,274,897 | A | | 6/1981 | Barefoot |
| 4,323,414 | A | | 4/1982 | Severson |
| RE30,918 | E | * | 5/1982 | Baer ...................... B60B 30/06 157/1.37 |
| 4,738,604 | A | * | 4/1988 | Fike ................... B29D 30/0602 156/414 |
| 5,095,744 | A | | 3/1992 | Macecek et al. |
| 5,544,945 | A | * | 8/1996 | Daudi ................... B21D 53/26 301/64.101 |
| 2017/0021580 | A1 | | 1/2017 | Henriksen |
| 2017/0021581 | A1 | | 1/2017 | Henriksen et al. |
| 2017/0173909 | A1 | | 6/2017 | Henriksen |

\* cited by examiner

ADJUSTING EXPANDABLE RIM WIDTH USING A BAND

CROSS REFERENCE TO RELATED APPLICATIONS

This application is a continuation of U.S. patent application Ser. No. 14/868,886, filed on Sep. 29, 2015, which claims priority to U.S. Provisional Patent Application No. 62/194,861 filed Jul. 21, 2015 and entitled "Expandable Rim Width Insert", the entire disclosure of which is incorporated herein by reference.

FIELD OF THE DISCLOSURE

The field relates generally to systems and methods for adjusting a rim width of an expandable rim suited for mounting a tire or a casing onto a machine.

BACKGROUND

Retreaded tires provide an economical way to gain additional use from tire casings after the original tread or retread has become worn. According to a method of retreading sometimes referred to as cold process retreading, a worn tire tread and other materials on a used tire are removed to create a buffed, generally textured, treadless surface along the circumference of the tire casing to which a new tread may be bonded.

The tire casing may be inspected for injuries, some of which may be skived and filled with a repair gum while others may be severe enough to warrant rejection of the tire casing. After completion of the skiving process, the buffed surface may be sprayed with cement that provides a tacky surface for application of bonding material and new tread. Next, a layer of cushion gum may be applied to the back, i.e., the inside surface of a new tread, or alternatively, the layer of cushion gum may be applied directly to the tacky surface on the tire casing. There are other methods that may eliminate the need for cement or cushion gum. The cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Certain retreading processes such as the buffing of the tire casing may be carried out on specialized equipment that rotatably mount the casing onto an expandable rim. The expandable rim may include various sections that move radially outwardly with respect to a central hub to expand to a circumference of the rim and sealably engage the beads of the casing, which is inflated to provide a resilient surface that can be buffed or otherwise processed. The machine may include a rasp that can be applied to the surface of the tire to remove rubber. Because the circumference of a tire casing can more easily be measured by the operator, the desired final radius of the tire casing may be identified in relation to the final circumference of the tire.

Expandable rims have a rim width that is fixed for a given machine. However, such fixed widths are not suitable for processing tires or casings having different widths, thus necessitating the purchase and installation of expandable rims having different widths between production runs of different tires. In some instances, the width of such rims maybe adjusted by cutting and welding the expandable rims to adjust an initial width of the rim, for example shorten the initial width of the rim. This is costly and also permanently changes the width of the expandable rim so that the rim is no longer usable with tires having a width equal to the initial width.

SUMMARY

Some embodiments include systems and methods for adjusting a width of a rim enabling mounting of tires of various widths on the rim, and in particular to adjusting a width of an expandable rim by positioning a band around the expandable rim contiguous with a flange segment of the rim so that the band has an adjusted rim width different than an original rim width.

In some embodiments, an expandable rim for mounting a tire thereon includes a base portion including a cylindrical structure and a rim portion. The base portion defines an axial channel therethrough. A rotatable hub is positionable through the axial channel to mount the rim thereon. The rim portion includes a rim segment, a first flange segment positioned on one side of the rim segment and a second flange segment positioned on an opposite side of the rim segment. The rim segment defines a circular curvature. The rim segment has an original rim width measured along a rotation axis of the rim between inward facing surfaces of the first flange segment and the second flange segment. The expandable rim is configured so that it may be expanded in a direction perpendicular to the rotation axis of the rim. A band is positioned around a circumference of the rim segment. The band is positioned contiguous with an inward facing surface of the first flange segment. The rim portion has an adjusted rim width measured along the rotation axis between a band inward facing surface and the inward facing surface of the second flange segment. The adjusted rim width is different from the original rim width.

In some embodiments, a machine for retreading tires includes a hub being rotatable with respect to the machine. The hub has a generally conical shape that is moveable axially along a rotation axis. An expandable rim is disposed around the moveable hub. The expandable rim includes a plurality of shoes arranged symmetrically around the hub. Each of the plurality of shoes includes a base portion and a rim portion. The base portion is positioned on the hub. The rim portion includes a rim segment and a flange segment on either side of the rim segment. The rim segment has an original rim width measured along the rotation axis between inward facing surfaces of the flange segments. A belt surrounds each of the plurality of shoes. The belt is disposed along the rim segment of the plurality of shoes. A band is positioned around a circumference of the rim segment on the belt. The band is positioned contiguous with an inward facing surface of the flange segment. The expandable rim is configured so that it may be expanded in a direction perpendicular to the rotation axis of the rim. An adjusted rim width measured along the rotation axis between a band inward facing surface and an inward facing surface of the flange segment at another side of the rim portion is different than the original rim width.

In some embodiments, a method for modifying a width of an expandable rim for use in a tire retreading machine includes assembling a plurality of shoes to form a cylindrical rim structure. Each of the plurality of shoes includes a rim portion and a base portion. The rim portion includes a rim segment, a first flange segment on one side of the rim segment and a second flange segment on an opposite side of the rim segment. The rim segment has an original rim width measured along the rotation axis between inward facing surfaces of the first flange segment and the second flange segment. A band is positioned around a circumference of the cylindrical rim structure on the rim segment of each of the plurality of shoes. The band is positioned contiguous with the first flange segment of each of the plurality of shoes. The expandable rim has an adjusted rim width measured along the rotation axis between a band inward surface and an inward facing surface of the second flange segment which is different than the original rim width.

In some embodiments, a process for buffing tires having varying widths using a buffing machine including an expandable rim for mounting the tire thereon is provided. The expandable rim includes a base portion and a rim portion. The rim portion includes a rim segment and a pair of flange segments positioned orthogonally to the rim segment on either side of the rim segment. The expandable rim has an original rim width measured between the flange segments. The process includes the steps of positioning a band contiguous with an inward facing surface of any one of the flange segment of the pair of flange segments. The positioning of the band causes the rim segment to have an adjusted rim width measured between a band inward facing surface of the band and an inward facing surface of the opposite flange segment. A tire having a tire width equal to the adjusted rim width is mounted on the rim segment. A first bead of the tire is positioned adjacent to the band inward facing surface and a second bead of the tire opposite the first bead is positioned adjacent to the inward facing surface of the opposite flange segment. The tire is the buffed on the buffing machine.

All combinations of the foregoing concepts and additional concepts discussed in greater detail below (provided such concepts are not mutually inconsistent) are contemplated as being included within this disclosure. In particular, all combinations of claimed subject matter appearing at the end of this disclosure are contemplated as being included within this disclosure.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
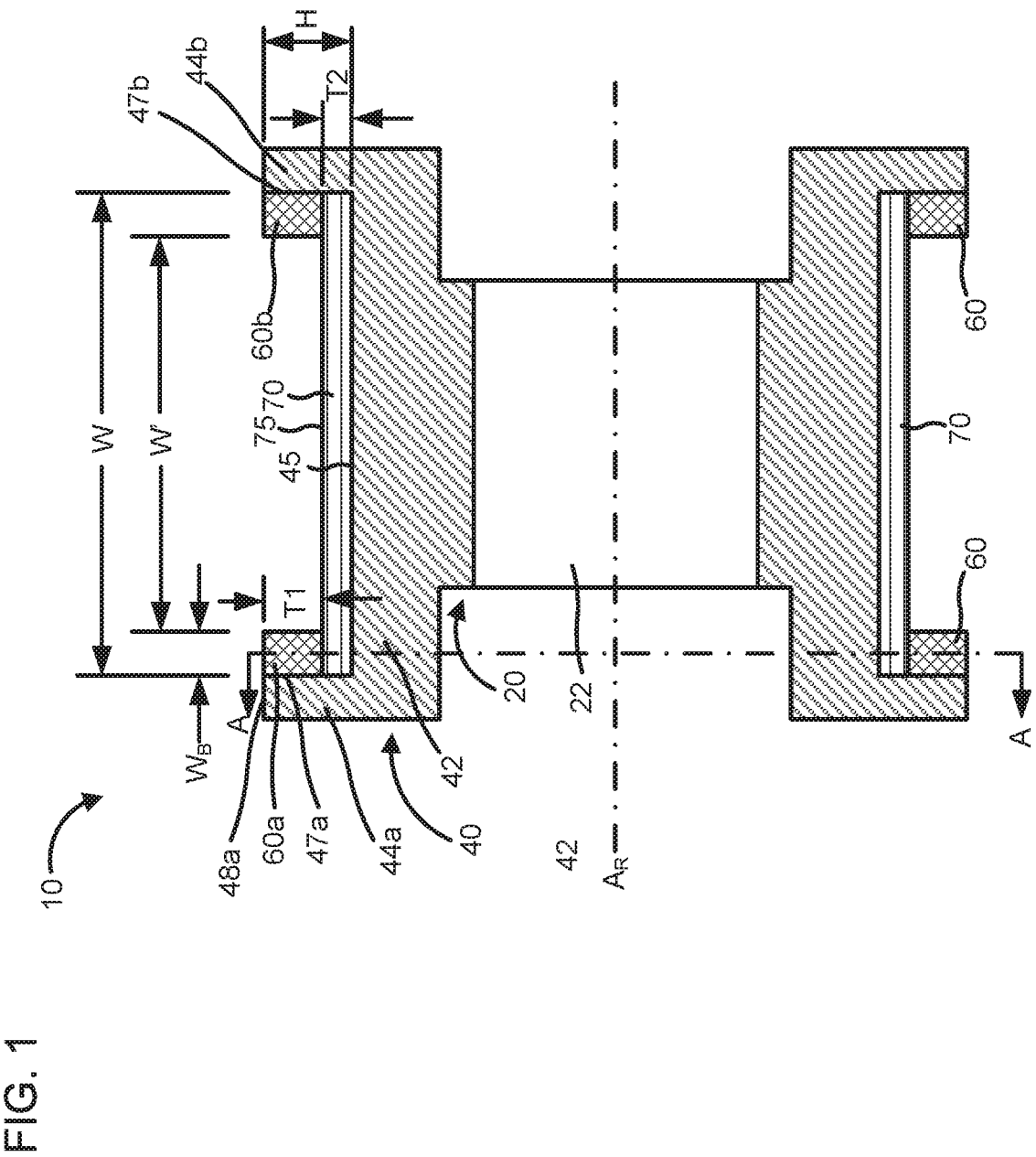
FIG. 1 is a side cross-section view of a rim having an adjustable rim width, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the disclosure. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Some embodiments relate to systems and methods for adjusting a width of a rim enabling mounting of tires of various width on the rim, and in particular to adjusting a width of an expandable rim by positioning a band around the rim contiguous with a flange segment of the rim so that the band has an adjusted rim width different than an original rim width.

Figure 2:
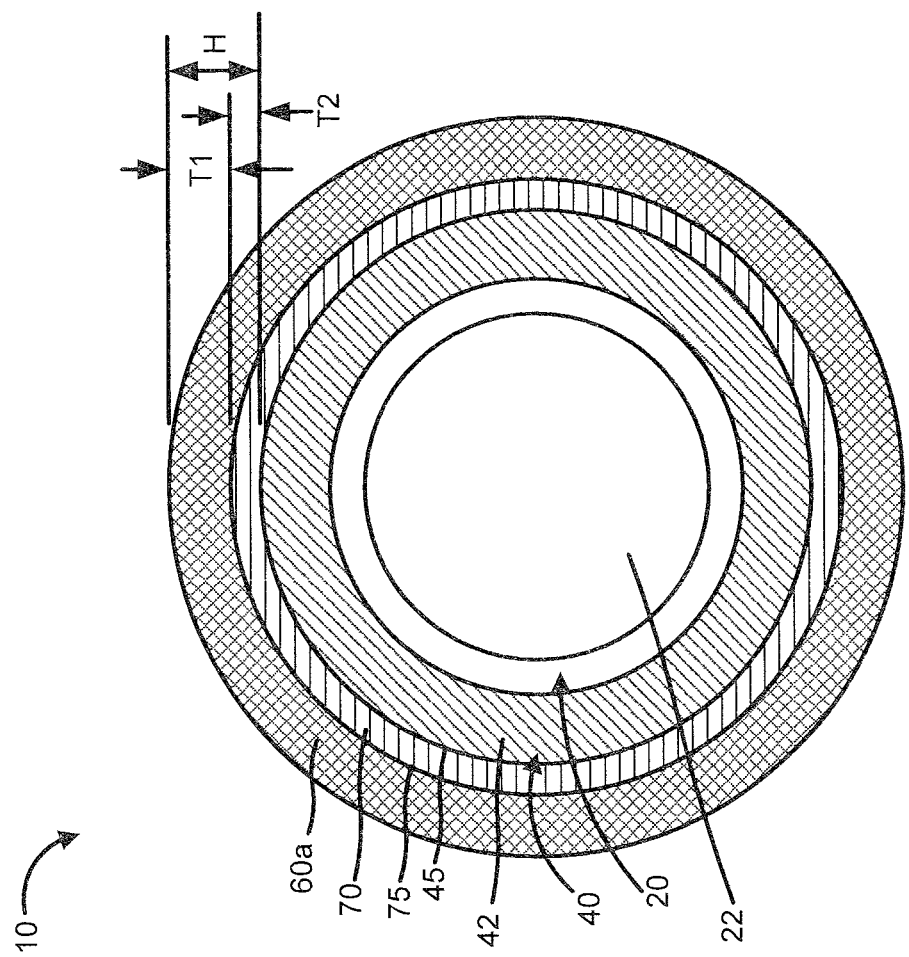
FIG. 2 is a front cross-section of the rim of FIG. 1 taken along the line AA shown in FIG. 1.

FIG. 1 is a side-cross section and FIG. 2 is a front cross-section of a rim 10 which has an adjustable rim width. The rim 10 is configured to be mounted on a rotatable hub (not shown), for example the hub 110 included in the buffing machine 100 described with respect to FIG. 4. The rim 10 includes a base portion 20 and a rim portion 40. The base portion 20 includes a generally cylindrical structure defining an axial channel 22 therethrough. The rim 10 can be mounted on the hub by inserting the hub through the axial channel 22 and securing the hub to an inner surface of the axial channel 22. In some embodiments, notches, grooves, indents, mounting apertures, holes, a snap-fit mechanism or any other structures can be defined on an inner surface of the axial channel 22 for securing the rim 10 to the hub. Furthermore, fasteners (e.g., screws, bolts, nuts, etc.) can be used to removably couple the rim 10 to the hub.

The rim 10 also includes a rim portion 40 positioned around the base portion 20. The rim portion 40 includes a rim segment 42, a first flange segment 44a and a second flange segment 44b (collectively referred to herein as "the flange segments 44") positioned orthogonally on either side of the rim segment 42 and extending away from the rim segment 42. The rim segment 42 and the flange segments 44 generally define a U-shape for securing a tire on the rim segment 20 between the flange segments 44. An outer surface or drum surface 45 of the rim segment 42 defines a circular curvature. A generally circular tire can be mounted on the drum surface 45 of the rim segment 42.

The rim segment 42 has an original rim width W measured along a rotation axis $A_R$ of the rim 10 between inwards facing surfaces of the opposing flange segments 44. The flange segments 44 are configured to abut against or be contiguous to at least a portion of edges of a tire having a tire width approximately equal to the width W between a first inward facing surface 47a of the first flange segment 44a and a second inward facing surface 47b of the second flange segment 44b, thereby securely retaining the tire on the outer surface of the rim segment 42. However, tires having smaller tire widths than the rim width W will not be securely retained by the flange segments 44, and can slide along the rotational axis of the rim 10 along the outer surface 45 of the rim segment 42 which is undesirable.

A first band 60a having a first band width $W_B$ is positioned around the rim segment 42 of the rim portion 40. The first band 60a is positioned contiguous to the first inward surface 47a of the first flange segment 44a, but in some embodiments, the first band 60a can be positioned contiguous to the second inward facing surface 47b of the second flange segment 44b. After the positioning of the first band 60a, the rim segment has an adjusted rim width W' measured between a first band inward facing surface and the second inward facing surface 47b of the second flange segment 44b which is different, for example smaller than the original rim width W.

The adjusted rim width W' can be substantially similar to the width of a tire which has a smaller rim width than the original rim width W. This allows a tire having a smaller width than the original rim width W to be mounted on the rim by securing between the first band 60a and the second flange segment 44b. The first band width $W_B$ can be adjusted or varied to accommodate tires having a range of widths. In some embodiments, the first band 60a has a first band thickness T1 equal to a distance H between a top edge 48a of the first flange segment 44a and the drum surface 45 of the rim segment 42. That is the first band 60a extends from the drum surface 45 to the top edge 48a of the first flange segment 44a.

In some embodiments, a second band 60b can also be positioned around the rim segment 42 of the rim portion 40. The second band 60b can be substantially similar to the first band 60a. In some embodiments, the second band 60b is positioned contiguous to the inward facing surface 47b of the second flange segment 44b. The adjusted rim width W' is then measured along the rotation axis of the rim 10 between a first band inward facing surface of the first band 60a and a second band inward facing surface of the second band 60b.

Each of the first band 60a and the second band 60b are unattached to the first flange segment 44a and the second band segment 44b i.e., are not coupled using any coupling mechanism (e.g., fasteners such as bolts, screws, etc.) to the flange segments 44 or rim segment 42. The first band 60a and the second band 60b can be formed from stretchable materials (e.g., include the band 160 as described herein) and configured to exert a compressive force on the rim segment 42 to retain the first band 60a and the second band 60b thereon. Furthermore, the flange segments 44 also serve as barriers for the first band 60a and the second band 60b preventing the first band 60a and the second band 60b from slipping off the rim segment 42, thereby retaining the first band 60a and the second band 60b on the rim segment 42.

Figure 5:
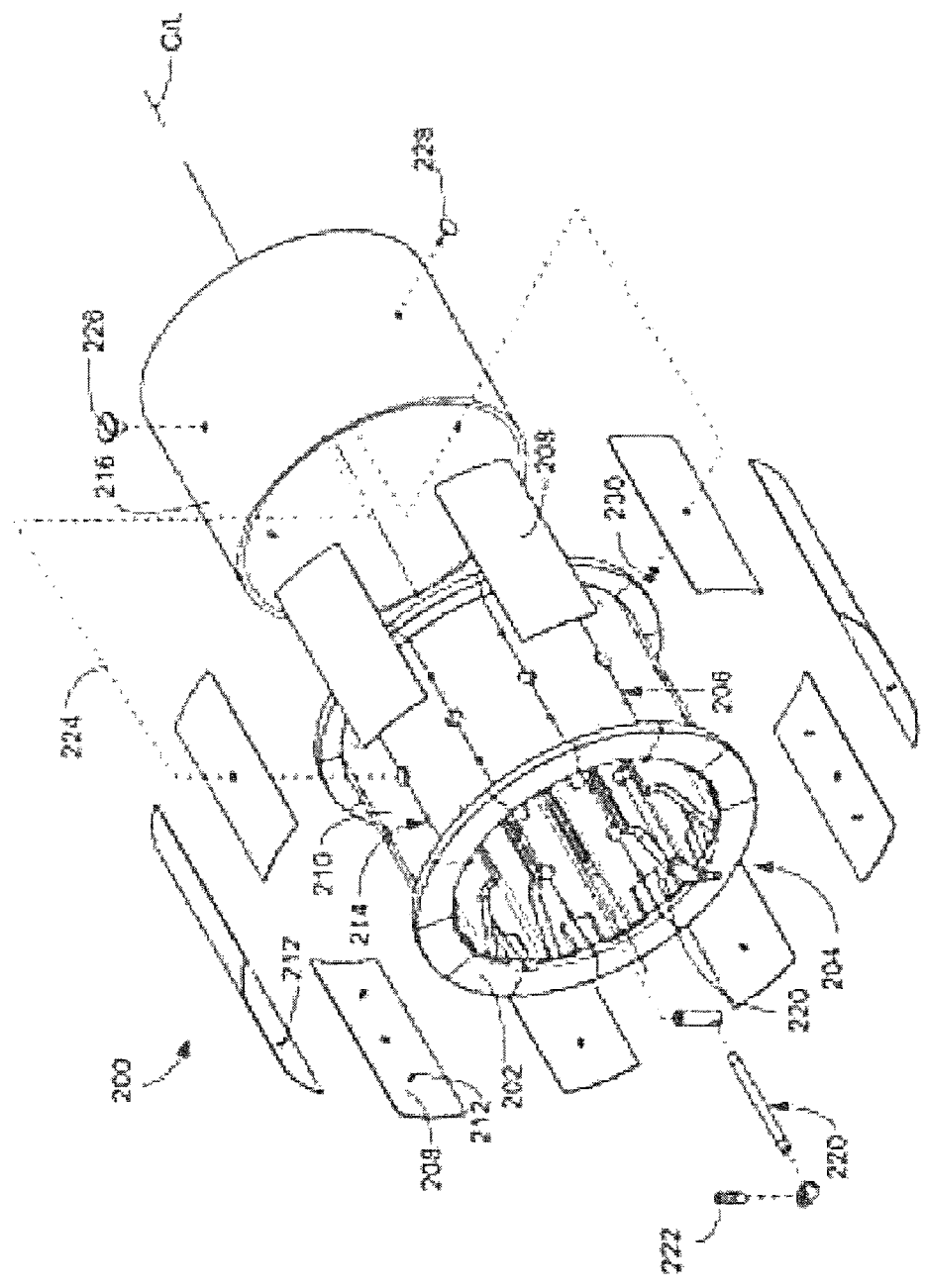
FIG. 5 is an exploded view of an embodiment of an expandable rim assembly that can be used in the tire buffing machine of FIG. 4.
Figure 6:
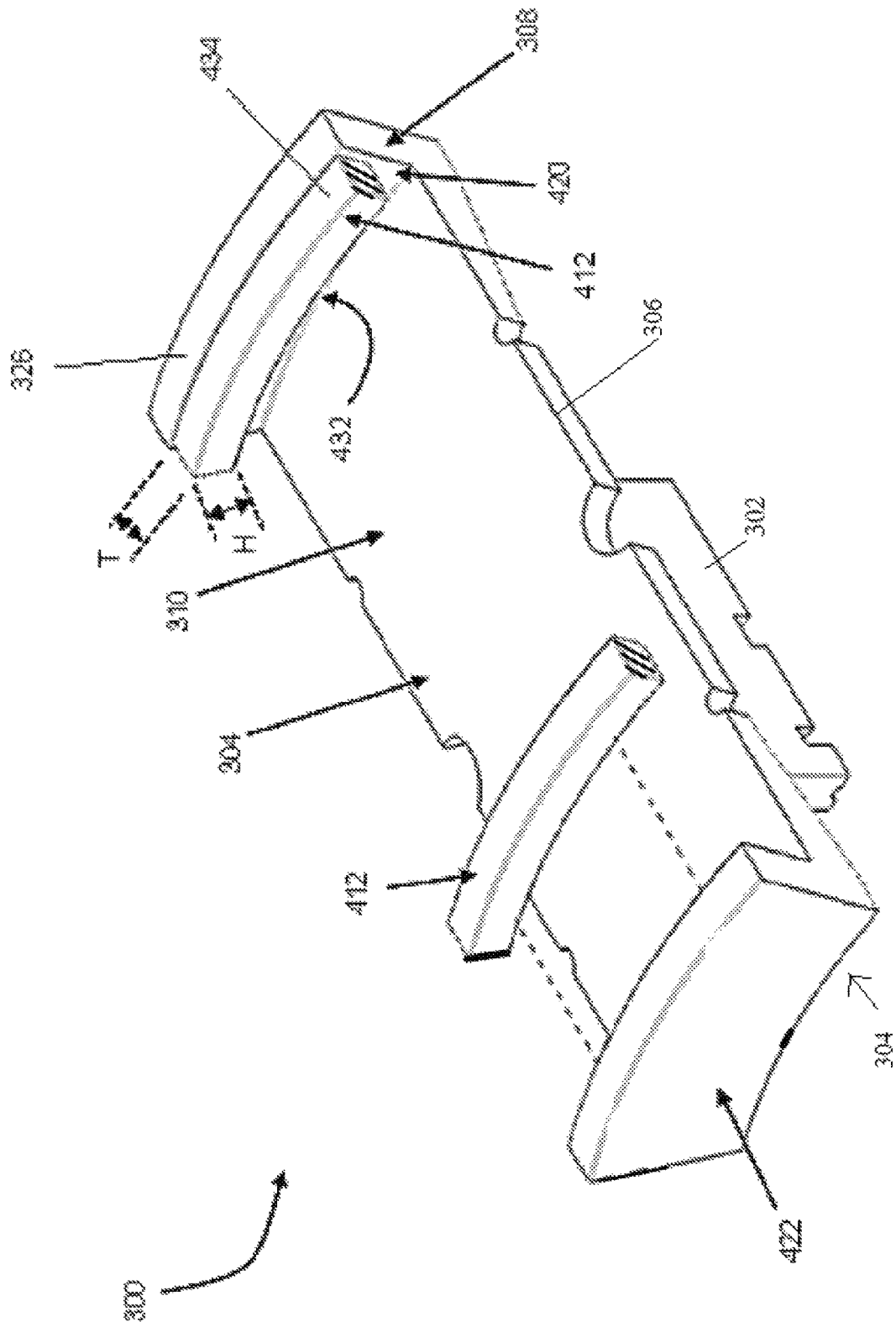
FIG. 6 is a perspective view of an embodiment of a shoe which can be included in the expandable rim assembly of FIG. 5.
Figure 7:
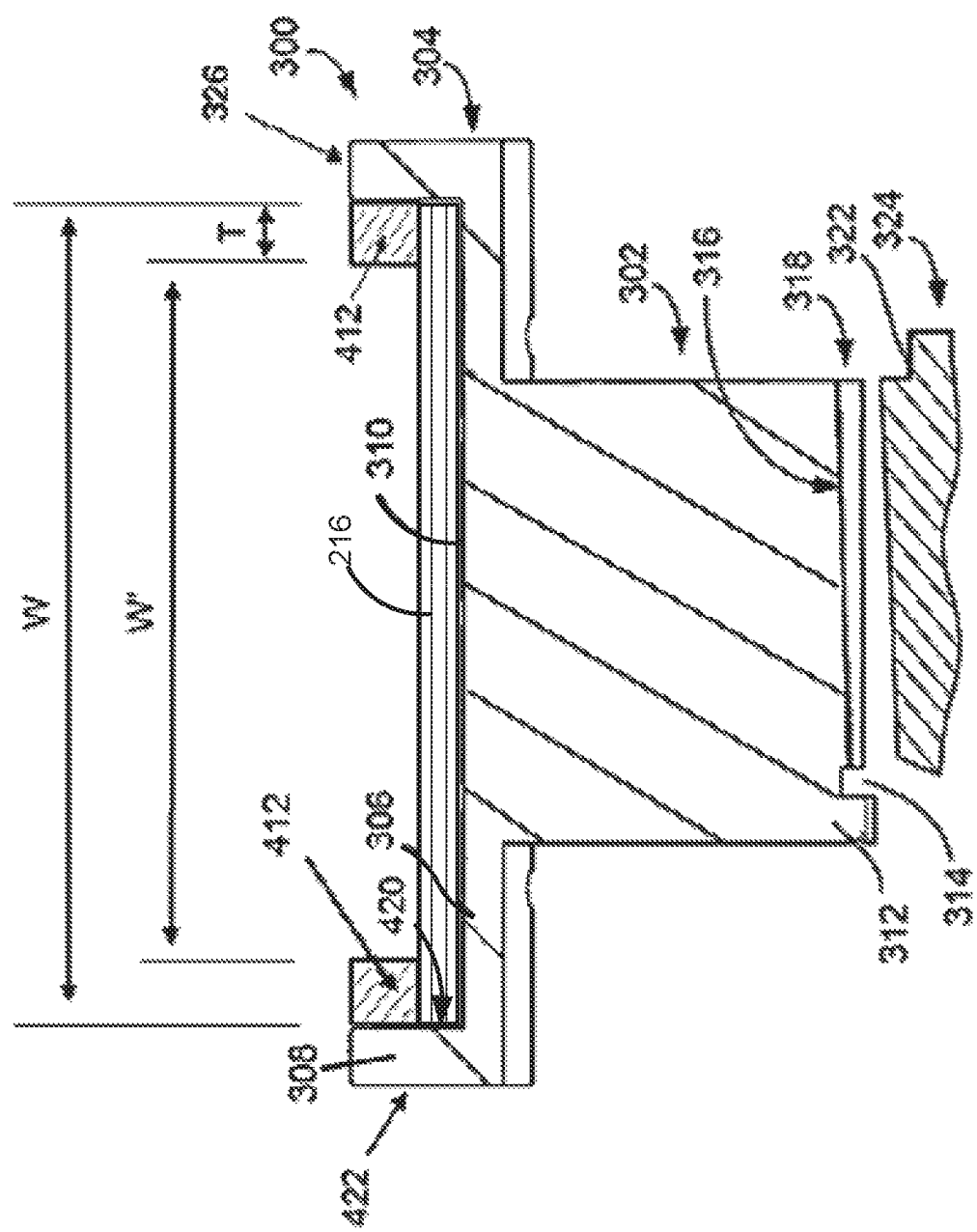
FIG. 7 is a side cross-section of the shoe of FIG. 6 with a belt and a band for adjusting a width of a rim segment of the shoe positioned thereon.

In some embodiments, the rim 10 can include an expandable rim (e.g., the expandable rim 200 described with respect to FIGS. 5-7). In some embodiments, the expandable rim 10 includes a plurality of shoes (e.g., the shoes 200 or 300 described with respect to FIGS. 5 to 7) configured to be positioned symmetrically around the hub to form a cylindrical rim structure. Each of the plurality of shoes define a segment of the base portion 20 and the rim portion 40 which includes the rim segment 42 and the flange segment 44, as described before herein. Each shoe has a circular curvature such that when the shoes are symmetrically positioned around the hub, each shoe defines a segment of the circular curvature of the rim segment 42. In some embodiments, the first band 60a and/or the second band 60b is positioned on the rim segment of each of the plurality of shoes and adjacent to a flange segment of each of the plurality of shoes. Each shoe is radially displaceable relative to the hub, thereby adjusting a diameter of the rim 10.

In some embodiments, a belt 70 or skirt can be positioned around the circumference of the expandable rim 10 on the rim segment of each of the plurality of shoes. The belt 70 can have a width equal to the width of the rim segment of each of the plurality of shoes and thereby, the rim segment of the expandable rim 10. The belt 70 is configured to retain each of the plurality of shoes on the hub. For example, the belt 70 can be formed from a stretchable or elastic material and configured to exert a radially inward force on each of the plurality of shoes relative to the hub. The belt 70 therefore retains each of the plurality of shoes on the hub, but is stretchable to allow the shoes to be radially displaced outward relative to the hub, thereby allowing adjustment (e.g., increase) of the diameter of the rim 10 (i.e., allowing expansion of the rim). In some embodiments, the belt 70 is configured to a form a sealing contact with a tire positioned on the rim segment 42, thereby allowing air to be filled and retained within the tire.

The belt 70 has a thickness T2 which is substantially smaller than the distance H between the drum surface 45 of the rim segment 42 and the top edge (e.g., the top edge 48a of the first flange segment 44a) of the flange segments 44. In some embodiments, the first band 60a and/or the second band 60b are positioned around the rim segment 42 on the belt 70 and in contact with a belt outer surface 75 which faces away from the drum outer surface 45. Furthermore, a thickness T1 of the first band 60a and/or the second band 60b can be equal to a distance measured from the top edge (e.g., the top edge 48a of the first flange segment 40a) of the flange segments 44 to the belt outer surface 75. In some embodiments, the belt 70 has a belt width less than the original rim width and the first band 60a and/or the second band 60b are positioned adjacent to the belt 70 on the drum surface 45.

Other suitable bands can be positioned around the rim segment 42 of the rim 10 to adjust the original rim width. For example, FIG. 3A shows a side view of a band 160 according to an embodiment. The band 160 can be used as the first band 60a, the second band 60b or any other band described herein. The band 160 can include a continuous circular ring which is positioned circumferentially on a rim segment of a rim (e.g., the rim segment 42 of the rim 10) as described herein. In some embodiments, the band 160 can be formed from a stretchable material, for example rubber, vulcanized rubber, silicone, a molded polymer or any other suitable stretchable and strong material. The band 160 can be stretched radially outwards and over the first flange segment 44a to position the band 160 on the rim segment of the rim (e.g., the rim segment 42 of the rim 40) or otherwise a belt (e.g., the belt 70) positioned on the rim segment. In some embodiments in which the rim includes an expandable rim, the position of the band 160 is performed while the expandable rim is in an unexpanded configuration. In some embodiments, the band 160 is positioned on the expandable rim once the expandable rim is in its expanded configuration. Expanding of the rim to a larger diameter also stretches the band so that the band continues to be retained on the rim segment of the rim while allowing the expandable rim to expand. In some embodiments, the band 160 is stretchable to allow a change in an initial diameter of the band by 1 inches, 2 inches, 3 inches, 4 inches or 5 inches inclusive of all ranges and values therebetween. The band may be configured such that its initial smaller diameter may be increased to a larger diameter while still maintaining substantially the same wall thickness or reducing the rim width by a predetermined amount.

Figure 3B:
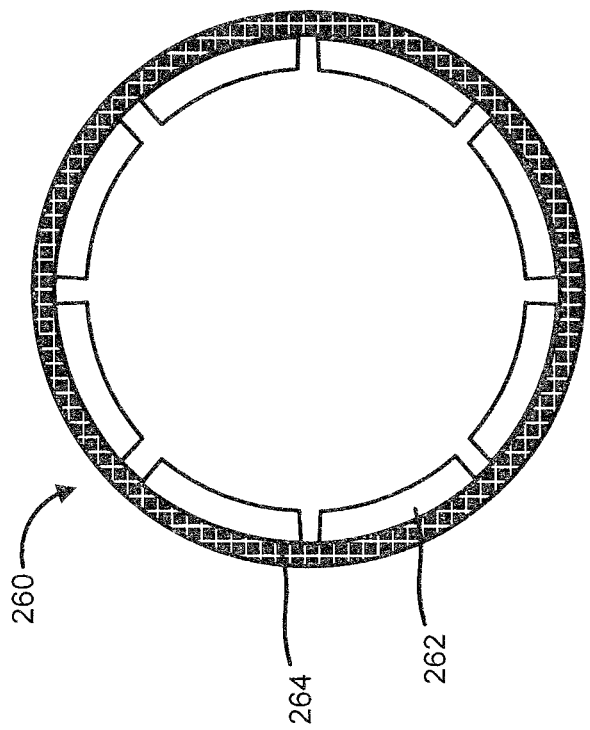
FIG. 3B is a side view of another embodiment of a band that can be used to adjust a width of a rim.
Figure 3A:
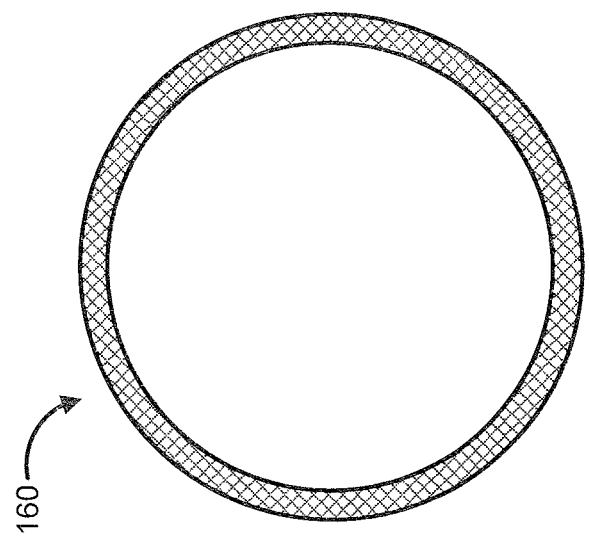
FIG. 3A is a side view of one embodiment of a band.

FIG. 3B is a side view of a band 260 according to an embodiment which can be used to adjust the width of a rim segment of a rim, for example the rim 10. The band 260 includes a plurality of band segments 262 which can be positioned around the circumference of a rim (e.g., the rim 10). Each of the plurality of band segments 262 can define a circular curvature corresponding to the circular curvature of the rim segment (e.g., the rim segment 42 of the rim 10). Each of the plurality of band segments 262 are configured to be positioned on a segment of the circumference of the rim segment. For example, the rim can include an expandable rim including a plurality of shoes (e.g., the plurality of shoes 202 or 300), and each of the plurality of band segments 262 and can have an arc length which is smaller or equal to an arc length of each shoe of the plurality of shoes.

Furthermore, each of the plurality of band segments 262 can have the same circular curvature as the rim segment of each of the plurality of shoes. It should be appreciated that while FIG. 3B shows the plurality of band segments 262 positioned adjacent to each other with a gap therebetween, in some embodiments, each of the plurality of band segments 262 can define an arc length so that each of the plurality of band segments 262 abut against an adjacent band segment 262, for example when the plurality of band segments 262 are positioned on an expandable rim in its unexpanded configuration. Any number of band segments 262 can be included in the band 260, for example 6, 8, 10, 12 or even more. In some embodiments, the number of band segments 262 corresponds to a number of shoes included in an expandable rim (e.g., the shoes 202 included in the expandable rim 200). Furthermore, the band 260 can be positioned on an expandable rim in its expanded or unexpanded configuration.

In some embodiments, the band segments 262 can be formed from an inelastic material such as metals (e.g., stainless steel, aluminum), plastics, rigid rubber, polymers, etc. Each of the plurality of band segments 262 are securely retained on the rim segment via a retaining member 264 can include, for example an O-ring, a garter spring, a band clamp or any other retaining member. The retaining member 264 is configured to retain or otherwise maintain the plurality of band segments 262 positioned around the circumference of the rim.

In some embodiments, each band segment 262 can be linked or coupled to an adjacent band segment 262 by a stretchable member (e.g., a rubber string or cord, a bungee cord, a spring, etc.) positioned on an end of the adjacent band segments 262. In some embodiments, the stretchable member can be positioned through a channel (not shown) defined through each of the band segments 262. In some embodiments, the stretchable member operatively couples the plurality of band segments 262 while allowing the band segments 262 to be radially displaced outwardly relative to each other for positioning or mounting on the rim segment of the rim, as described herein. Once mounted the stretchable member exerts a radially inward force on each of the band segments 262 to urge the band segments 262 towards the rim, thereby retaining each of the band segments 262 on the rim. In this manner, some embodiments permit the wall thickness to remain substantially the same (for reducing the rim width) while the rim is expanded from a smaller diameter to a larger diameter.

Figure 4:
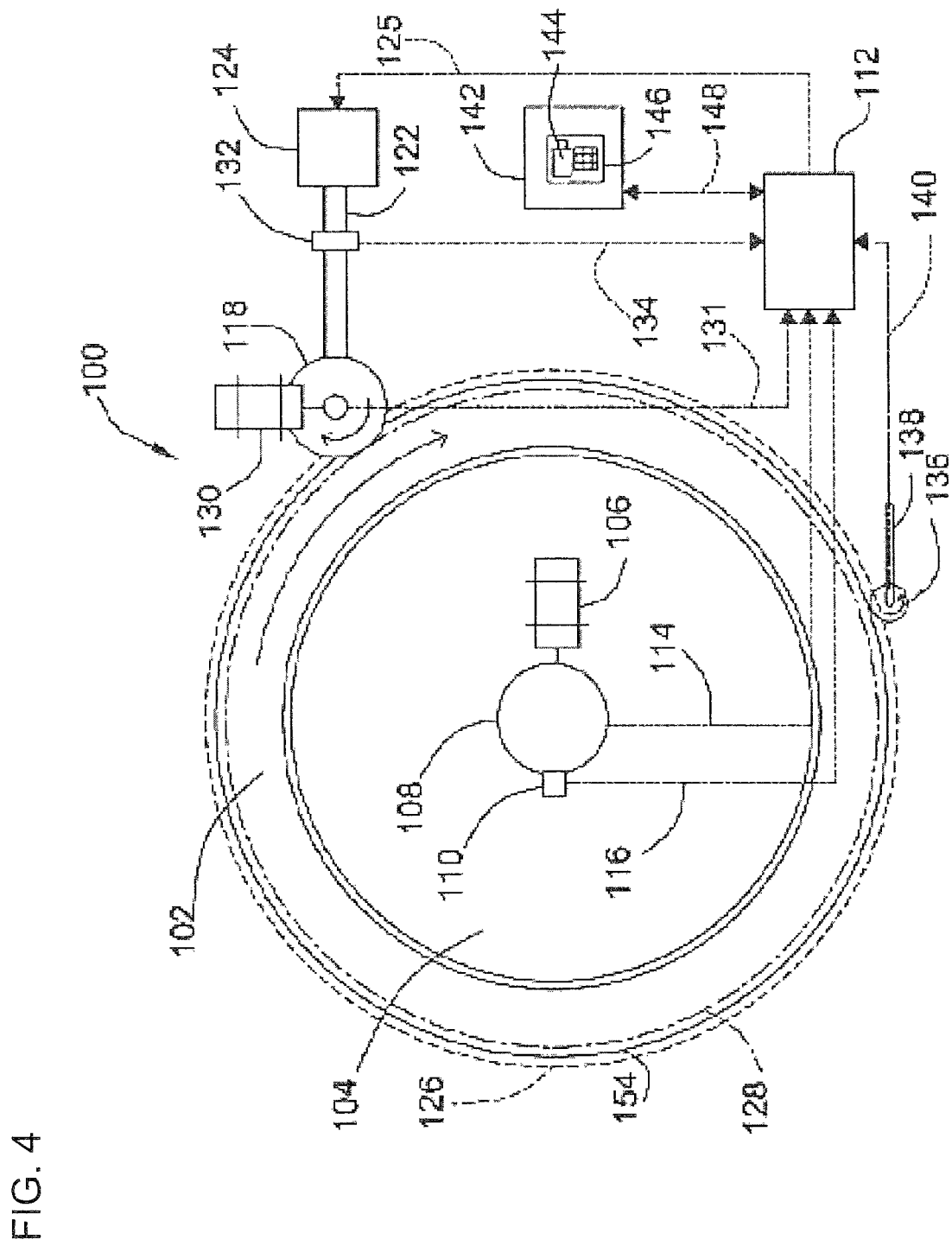
FIG. 4 is a schematic illustration of a tire buffing machine according to an embodiment.

FIG. 4 is a schematic illustration of a buffing machine 100 having a tire 102 mounted on a rotating, expandable rim 104. As shown, the machine 100 may be a standalone, dedicated machine for buffing tires prior to a retreading operation, or may alternatively be part of a retreading machine that can perform other operations, such as installing a new tread onto the casing.

During operation, the expandable rim 104 and tire 102 rotate at a constant angular rate of rotation, for example, 60-90 revolutions per minute (RPM), but may also rotate at a variable speed. An electric motor 106 is connected to a hub 108 of the expandable rim 104 to provide the rotation of the tire 102, but any other type of rotary actuator may be used, such as hydraulically or pneumatically powered motors, or even mechanical arrangements providing a rotating output. As shown, the hub 108 includes timing features that are picked up by an angular displacement encoder 110 associated with the machine 100. A control signal of the motor 106 may be provided by an electronic controller 112 via a motor control conduit 114, while information indicative of the rotation of the hub 108 may be provided to the controller 112 by the encoder 110 via a tire rotation information conduit 116.

The machine 100 further includes a buffing tool or rasp 118. The rasp 118 may be any device capable of cutting material from the tire 102 as it rotates. In an embodiment, the rasp 118, can include a laminated steel drum having saw teeth arranged around its outer cylindrical surface.

Although many configurations are possible, the rasp 118 is connected to the machine 100 at the end of an arm 122. A rasp rpm sensor 132 is communicatively coupled to the rasp motor 130 and the electronic controller 112 via rasp rpm conduit 134, and configured to provide information on rasp 118 rotational speed to the electronic controller 112. The position of the arm 122 and of the rasp 118 relative to the tire 102 can be adjusted by a rasp actuator 124. The rasp actuator 124 positions a rasp head to sweep a circular arc across a face of the tire 102 at a defined radius. A force thus derived is caused by the interference between the a face of the rasp 118 and the circumference of the tire 102 being buffed. There are other arrangements of the arm 122, rasp actuator 124, and other parts of the cutting assembly that are known in the art and incorporated herein. This pressing or normal force effects removal of material from the tire 102 and is carried out in response to command signals provided by the electronic controller 112 via a rasp actuator control conduit 125. In FIG. 4, an outer circumference 126 of the tire 102 is illustrated by dashed line. In that same figure, a cutting depth 128, which is located radially inward from the outer circumference 126 relative to a center of the tire 102, is shown in dash-dot-dashed line.

The electronic controller 112 is communicatively coupled to an operation panel 142 via an input panel conduit 148. The input panel 142 includes an input device 146 (e.g., an alphanumeric keyboard, switches, buttons, etc.) and a display 144. A user can input commands, for example rasp 118 cutting depth, tire rotation speed, tread pattern, etc. via the input device 146. A cutting depth sensor 136 which can include a small rotatable wheel is positioned in contact with an outer surface of the tire 102 via a depth sensor mounting arm 138. The cutting depth sensor 136 is communicatively coupled to the electronic controller 112 via depth sensor conduit 140. While various sensors included in the buffing machine 100 are depicted as communicatively coupled to the electronic controller 112 via conduits, in some embodiments, each of the sensors, input panel 142 or otherwise electronic components can be wirelessly coupled to the electronic controller 112 (e.g., via Bluetooth®, Wi-Fi, or any other wireless communication protocol).

During a cutting operation, the rasp 118 is driven by a rasp motor 130 in a counter-rotational direction relative to the tire 102. The motor 130 is controlled and monitored by the electronic controller 112 through a motor control conduit 131. When the rasp 118 is in position at the cutting depth 128 and the rasp motor 130 is operating, material is removed from the outer portion of the tire 102 as the teeth or other cutting mechanism of the rasp 118 are pressed against the outer circumference 126 of the tire. To prevent rotation and to retain the tire 102 firmly on the expandable rim 104 during the cutting operation, the expandable rim 104 is placed in an expanded position such that a rubber skirt or belt (not shown) placed around an outer rim thereof sealably engages a bead of the tire 102 to seal the inner cavity of the tire 102 and inflate the tire 102 when air is pumped in its interior. The expandable rim 104 also laterally engages the bead of the tire 102 to ensure that the tire 102 maintains a proper inflated shape and is securely retained by the expandable rim 104 during the various operations that are performed on the tire 102.

An exploded view of an expandable rim assembly 200 is shown in FIG. 5. The expandable rim assembly 200 may be associated with a machine (e.g., the buffing machine 100) in much the same way as the expandable rim 104 described above and shown in FIG. 4. The expandable rim assembly 200 is configured for use with a hub (e.g., the hub 108), which includes surfaces that push radially ramped portions of a plurality of shoes 202 that make up the expandable rim 200 radially outward, thus pushing them apart to expand the rim assembly 200.

In the embodiment, the expandable rim assembly 200 includes the plurality of segmented shoes 202 that together, form a cylindrical rim structure 204. Each of the plurality of segmented shoes 202 extends over an angle around the cylindrical rim structure 204. As shown in FIG. 5, expandable rim includes twelve shoes 202 forming cylindrical structure 204 and the angle is about 30 degrees, but other angles and number of shoes can be used. Radially extending slits 206 extending through the cylindrical rim structure 204 result at the interfaces between adjacent shoes 202. Each slit 206 is covered by a respective support plate 208, which has a generally curved shape that is consistent with an outer drum surface 210 of the cylindrical rim structure 204. In the embodiment shown, each support plate 208 forms two posts 212, each of which locates the support plate 208 on the outer surface 210 of the cylindrical structure 204 (also referred to herein as "drum surface 210") by being inserted into a corresponding opening 214 formed by shallow cutouts or detents in the edges of the shoes 202 along the slits 206.

A belt or skirt 216 having a generally cylindrical shape is placed around and covers the outer drum surface 210 of the cylindrical rim structure 204. One or more (two shown) air conduits 220 provide compressed air to and from a nipple 222 through a series of aligned openings along an air path 224 to an air nozzle 226 that is connected to the belt 216 and disposed within the interior of a tire (e.g., the tire 102) when the tire is mounted onto the expandable rim assembly 200. In this way, the tire can be inflated and deflated, as desired, by providing or evacuating air to/from the air nozzle 226. Bolts 228 that engage nuts 230, or a different fastening arrangement, can be used to retain the belt 216 around the cylindrical rim structure 204 such that the belt 216 is prevented from rotating relative to the cylindrical rim structure 204 and the shoes 202 are held together.

FIG. 6 is a perspective view of a shoe 300 and FIG. 7 is a side cross-section thereof. The shoe 300 is suitable for use in an expandable rim, for example, in place of one or each of the shoes 202 that make up the expandable rim assembly 200 shown in FIG. 5 and described above. The shoe 300 includes a base portion 302, which is sometimes referred to as the shank and which is generally plate-shaped, and a rim portion 304, which defines a circular segment of an expandable rim. The rim portion 304 includes a rim segment 306 and a flange segment 308, which together form a structure having a generally U-shaped cross section, into which a tire is accommodated, in the known fashion. The rim segment 306 includes a drum surface 310 onto which other structures may be disposed such as, for example, the support plates 208 and/or portions of the inner belt 216, when the shoe 300 has been assembled into an expandable rim assembly such as the expandable rim assembly 200 (FIG. 5).

At the radially inward part of the shoe 300, on the end of the base portion 302, various features are formed that facilitate the mounting, retention, and relative motion of the shoe 300 with respect to a conical hub (e.g., the hub 108) around which the shoes 300 are positioned, when the rim is expanding or contracting during operation. It should be appreciated that although the interface features shown may be common across different expandable rim assemblies, other features than those shown here can be used. In the embodiment illustrated in FIGS. 6 and 7, the end of the base portion 302 that is the furthest away from the rim portion 304 forms a step 312 that is disposed next to a notch 314. A ramp 316 formed at the bottom of a V-shaped channel 318 extends away from the end of the base portion 302, towards the rim portion 304, in a direction away from the step 312 along the bottom edge of the base portion 302. When the shoe 300 is assembled into an expandable rim assembly, for example, the expandable rim assembly 200 (FIG. 5), the ramp 316 and channel 318 matingly and slidably engage a rib 322 of a conical hub 324 that actuates the shoe 300 in the known fashion.

A perspective view of the shoe 300 with a portion of a set of bands 412 configured to be positioned adjacent to opposing flange segments 308 of the shoe 300, is shown in FIG. 6. The bands 412 can include a continuous circular ring (e.g., the band 160) configured to be positioned around the cylindrical rim structure (e.g., the cylindrical rim structure 204) formed by the plurality of shoes 300 positioned adjacent to each other. In some embodiments, the bands 412 can include a plurality of band segments (e.g., the plurality of band segments 262) having an annular shape and a curvature that matches the curvature of the inside face 420 of each flange segment 308.

In some embodiments, the set of bands 412, for example, a circular ring or a band segment forming each of the set bands 412 has a rectangular cross section. The bands 412 have a bottom surface 432 and a top surface 434 such that the curvature of the bottom surface 432 is generally concentric with the curvature of the top surface 434. The bands 412 extend over the same circular segment of the shoe 300 they are installed on to preserve unobstructed operation of the expandable rim assembly, for example, the assembly 200 discussed above. In some embodiments, the bands 412 can be formed from a stretchable material (e.g., rubber, vulcanized rubber, silicone rubber, polymers etc.) such that the bands 412 exert an inwardly radial force on the rim assembly which retains the bands 412 on the rim assembly. In embodiments in which the bands 412 include a plurality of band segments (e.g., the band segments 262), a retaining member, for example an O-ring, a garter spring, or a band clamp (e.g., the retaining member 264) can be positioned around the band segments. The retaining member exerts an inward radial force on the plurality of band segments thereby, retaining the band segments forming the bands 412 on the rim assembly. Each band segment can have an arc length equal or substantially equal to of an arc length of the rim segment 306 of the rim portion 304 of each shoe 300 (e.g., within +/−5% of the arc length of the each shoe 300).

Each of the bands 412 are unattached to the flange segments 308 i.e., are not coupled using any coupling mechanism (e.g., fasteners such as bolts, screws, etc.) to the flange segments 308 or rim segment 306. For example, the bands 412 can be formed from stretchable materials (e.g., include the band 160 as described herein) and configured to exert a compressive force on the rim segment 306 to retain the bands 412 thereon. Furthermore, the flange segments 308 also serve as barriers for the bands 412 preventing the bands 412 from slipping off the rim segment 306, thereby retaining the bands 412 thereon.

In some embodiments, the bands 412 can be positioned over a belt 216 disposed around the plurality of shoes 300, as shown in FIG. 7, which can be assembled to form a rim, for example expandable rim assembly 200. In some embodiments, a height H of the band 412 can extend from an outer surface of the belt disposed over the rim segment to a top edge of the flange segments 308. Alternatively, the bottom surface 432 of the insert 412 may have a height H extending from the drum surface 310 to the top edge of the flanges segments 308 and provide a flush contact between the bottom surface 432 of the bands 412 and the drum surface 310. In this alternate configuration, the bands 412 can be positioned adjacent the belt 216.

In some embodiments in which the bands 412 include a plurality of band segments 412 a wall thickness T of each of the band segments 412, which is measured as a distance between each band segment 412 extends from the inside face 420 of the respective flange segment 308 contiguous to which the band segment 412 is positioned to, is the same for the band segments 412 positioned contiguous to all of the shoes 300 for a given expandable rim assembly 200, such that a width of the drum surface 310 that accommodates the bead of a tire is reduced. Similarly, a height H of the band or band segment 412, as measured by how far the band 412 extends from the top surface 434 towards the drum surface 310, can have any height sufficient to laterally retain the bead and/or sidewall of the tire or casing disposed between the bands 412 while still allowing the insertion and removal of the tire or casing onto the expandable rim assembly. For illustration, the height can be at minimum, the distance from the top surface 326 of the flange segment 308 to a clearance above the belt 216 and at maximum, the distance that the flange segment 308 extends radially from the drum surface 310 so that normal or expected operation of the expandable rim is not affected. Other heights may also be used.

The bands 412 can be made from a stretchable material which can be radially expanded outwardly for positioning over the drum surface 310 or the belt 216 positioned over the drum surface 310 of the rim portion 304. Once positioned the band 412 exerts an inwardly radial force directed towards the drum surface 310, thereby securing the band 412 on the drum surface 310. In some embodiments in which the band 412 includes a plurality of band segments 412, the band segments 412 can be made from plastic, steel, aluminum, rubber, vulcanized rubber or any other suitable material. The plurality of band segments 412 can be retained on the drum portion 410 of the rim portion 304 via a retaining member positioned over the band segments, as described before. Once positioned, the bands 412 modify the original rim width W, which extends between inward facing surfaces of the flange segments 308, to a new shorter adjusted rim width W', which extends between band inward facing surfaces of the bands 412. The bands 412 can be positioned on the drum surface 310 or otherwise the belt 216 positioned on the drum surface 310 while the rim is in in its unexpanded or expanded configuration or position, as described before herein. The bands may be configured such that the expansion does not substantially alter (e.g., decrease) the wall thickness of the bands, thereby curtailing variations in the width W' as the rim is expanded.

Figure 8:
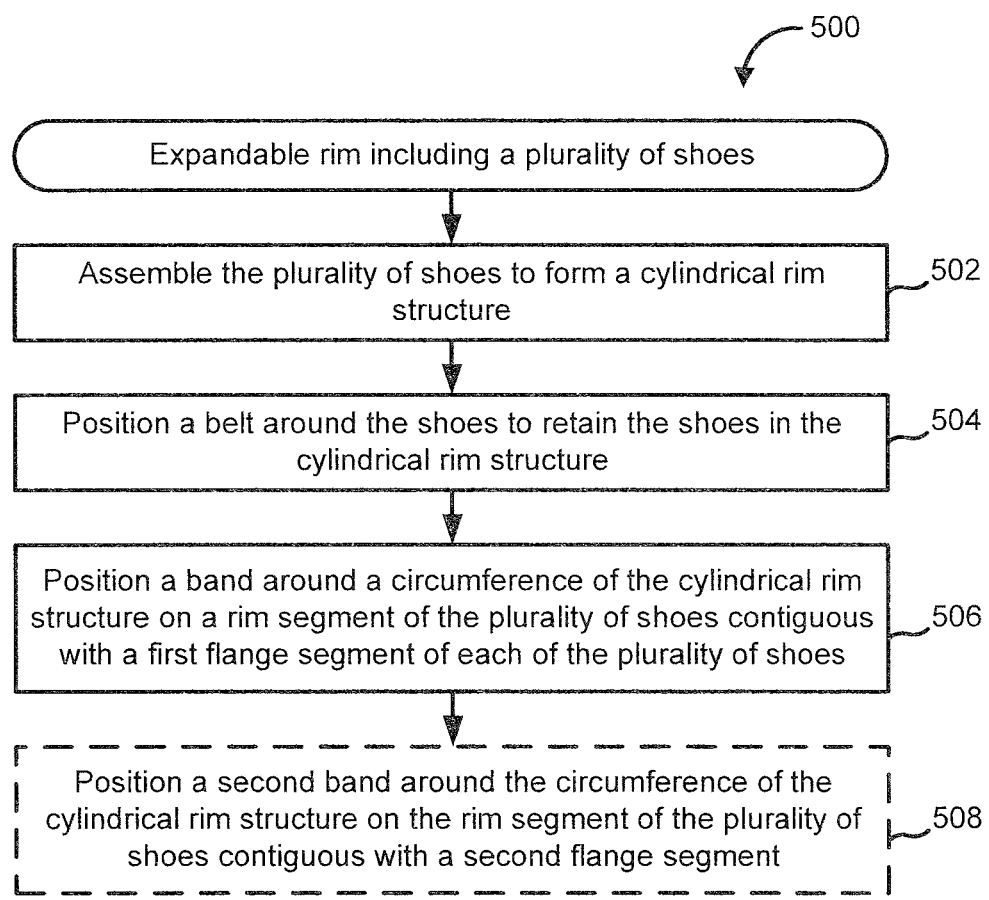
FIG. 8 is a schematic flow diagram of an embodiment of a method for modifying the width of an expandable rim.

FIG. 8 is a flowchart of a method 500 of modifying an original rim width of an expandable rim according to an embodiment. The method 500 includes assembling a plurality of shoes at 502. Each of the plurality of shoes includes a rim portion. Each rim portion includes a rim segment with a first flange segment positioned on one side and a second flange segment positioned opposite the first flange segment. For example, the plurality of shoes can include the shoes 200 or 300 described before herein which are assembled on a hub, e.g., the hub 108, as described in detail with respect to FIGS. 4-7. The rim portion has an original rim width measured between inward facing surfaces of opposing flange segments of each of the plurality shoes.

In some embodiments, a belt is positioned around the shoes to retain the shoes in the cylindrical rim structure at 504. For example, the belt 216 is positioned on the plurality of shoes 202 included in rim 200, as described before herein. A band is positioned around a circumference of the cylindrical rim structure on a rim segment of the plurality of shoes at 506. For example, the band 412 is positioned on the cylindrical rim structure formed by assembling the plurality of shoes 300 on the belt positioned on the rim segment or adjacent to the belt on the drum surface 310 of the rim segment 306 of the plurality of shoes 300. The band 412 is positioned contiguous to a first flange segment (e.g., the flange segment 308 of each of the plurality of shoes 300). By positioning the band on the rim portion, the rim portion has an adjusted rim width measured between a band inward facing surface of the band and the inward facing surface of the opposite flange segment which is less than the original rim width. This allows a tire having width smaller than the original rim width to be securely mounted on the rim, as described herein.

In some embodiments, a second band is positioned around a circumference of the cylindrical rim structure on the rim segment of the plurality of shoes at 508. The second band is positioned contiguous to the second flange segment of the rim portion. In some embodiments, the adjusted rim width is measured between a first band inward facing surfaces and a second band inward facing surface. Positioning of two bands allows centering of the tire on the rim segment, for example to center the tire relative to a hub on which the tire is mounted and/or a rasp used to buff the tire, eliminate any wobbling or undue vibrations that might be encountered if the tire is not centered on the rim.

Figure 9:
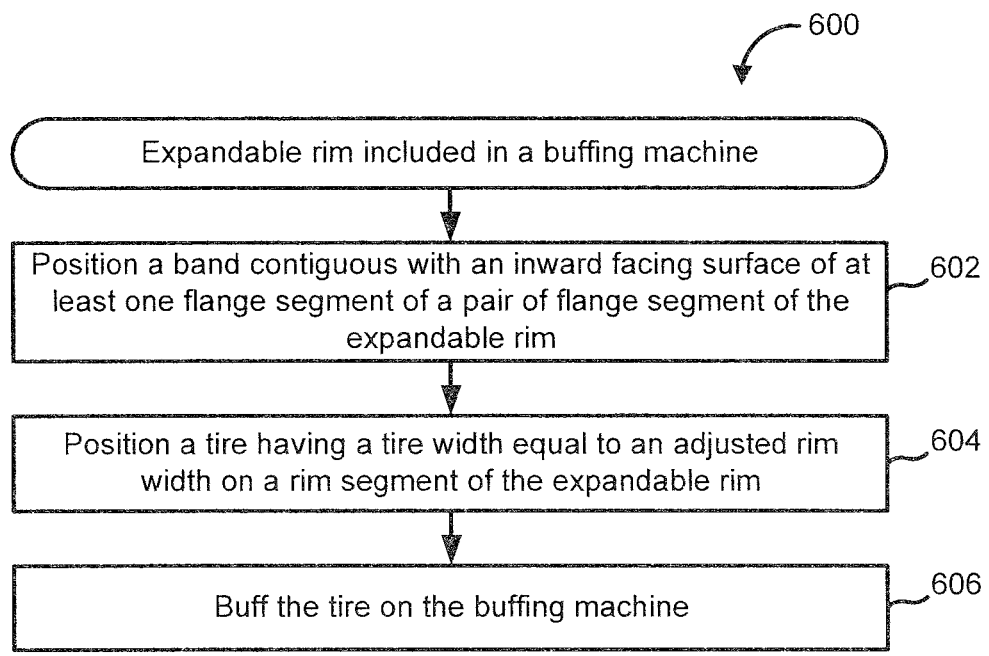
FIG. 9 is a schematic flow diagram of a process for buffing a tire, according to an embodiment.

FIG. 9 is a schematic flow diagram of a process 600 for buffing tires having varying widths using a buffing machine. The buffing machine (e.g., the buffing machine 100) includes a hub (e.g., the hub 108) and an expandable rim (e.g., the expandable rim 104 or 200). The expandable rim includes a base portion configured to be mounted on the hub, and a rim portion. The rim portion includes a rim segment and a pair of flange segments positioned orthogonally to the rim segment on either side of the rim segment. The expandable rim has an original rim width measured between the flange segments.

The process 600 includes positioning a band contiguous with an inward facing surface of any one of the flange segment of the pair of flange segments at 602. The positioning of the band (e.g., the band 60a, 60b, 160, 260, 412 or any other band described herein) causes the rim segment to have an adjusted rim width measured between a band inward facing surface of the band and an inward facing surface of the opposite flange segment. In some embodiments, the band can include a stretchable or otherwise elastic band (e.g., a rubber band) which is stretched over the flange segment of expandable rim with the expandable rim in an initial unexpanded configuration, and positioned on a drum surface of the rim segment. In some embodiments, a belt is positioned on the drum surface of the rim segment as described herein, and the band is positioned on an outer surface of the belt.

A tire having a tire width equal to the adjusted rim width is mounted on the rim segment of the expandable rim at 604. For example, the tire is positioned on the expandable rim with the expandable rim being in the unexpanded configuration. The expandable rim is then expanded to secure the tire on the rim segment. During such expansion, the rim width remains substantially the same with the thickness of the band remaining substantially the same as the expandable rim is moved from the unexpanded to the expanded configuration. The belt which can be positioned on the drum surface can contact a first bead and a second bead of the tire opposite the first bead to form an air tight seal between the belt and the tire. Air can then be filled in the tire using any suitable means.

The first bead of the tire is positioned adjacent to the band inward facing surface and a second bead of the tire is positioned adjacent to the inward facing surface of the opposite flange segment. Thus a tire having a tire width less than the original rim width is secured on the rim segment by adjusting the rim width. The tire is buffed on the buffing machine at 606, for example as described with respect to the buffing machine 100. In some embodiments, the band is a first band and a second band is positioned contiguous with the inward facing surface of the opposite flange segment. In some embodiments, the adjusted rim width is measured between a first band inward facing surface and a second band inward facing surface. Positioning a band adjacent to each of the pair of flange segments allows the tire to be mounted substantially centered on the rim segment of the expandable rim.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the invention unless otherwise claimed. No language in the specification should be construed as indicating any non-claimed element as essential to the practice of the invention It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Some embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

It is important to note that the construction and arrangement of the various embodiments are illustrative only. Although some embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein.

While this specification contains many specific implementation details, these should not be construed as limitations on the scope of this disclosure or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An expandable rim for mounting a tire thereon, comprising:
   a plurality of shoes arranged circumferentially, each of the plurality of shoes defining a rim portion;
   each rim portion including a rim segment, a first flange segment positioned on one side of the rim segment and a second flange segment positioned on an opposite side of the rim segment, the rim segment defining a circular curvature, the rim segment having an original rim width measured between inward facing surfaces of the first flange segment and the second flange segment;

a band positioned around a circumference of the rim portion, the band retained on the rim segment by an inward surface of the first flange segment, the band exerting a radially inward compressive force on the position around the circumference of the rim portion to retain the band thereon, a band inward facing surface of the band configured to interface with a first bead of the tire when the tire is filled with air; and a belt positioned around the rim portion, the belt having a width equal to the original rim width of the rim segment and the belt configured to form a sealing contact with the first bead and a second bead of the tire to allow air to be filled and retained within the tire when the second bead interfaces with the second flange segment;

wherein the rim portion has an adjusted rim width between the band inward facing surface and the inward facing surface of the second flange segment, the adjusted rim width less than the original rim width, and the inward facing surface of the second flange segment configured to interface with the second bead of the tire when the tire is filled with air.

2. The expandable rim of claim 1, wherein the band is a first band, the expandable rim further comprising:

a second band positioned around the circumference of the rim portion, the second band retained on the rim segment by an inward surface of the second flange segment, the second band exerting a radially inward compressive force on the position around the circumference of the rim portion to retain the second band thereon, wherein the adjusted rim width is measured between inward facing surfaces of the first band and the second band.

3. The expandable rim of claim 1, wherein the band has a band height equal to a distance between a top edge of the flange segment and a drum surface of the rim segment.

4. The expandable rim of claim 1 wherein the belt is positioned between the band and a drum surface of the rim segment.

5. The rim of claim 1, wherein the band is a continuous circular ring.

6. The rim of claim 1, wherein the band is formed from a stretchable material.

7. The rim of claim 6, wherein the stretchable material comprises a molded polymer.

8. The expandable rim of claim 1, wherein the band is a first band, the expandable rim further comprising:

a second band positioned around the circumference of the rim portion between the first band and the first flange segment, the second band retained on the rim segment by an inward surface of the first flange segment, wherein the adjusted rim width is measured between the first band inward facing surface the inward facing surface of the second flange segment.

9. A machine comprising:

an expandable rim including a plurality of shoes arranged circumferentially, each of the plurality of shoes including a rim segment, a first set of flange segments, and a second set of flange segments, each of the first set of flange segments and each of the second set of flange segments on opposite sides of the rim segment, the rim segment having an original rim width between inward facing surfaces of the first set of flange segments and the second set of flange segments;

a band positioned around a circumference of the rim segments of the plurality of shoes and rotatable circumferentially relative to the rim segments of the plurality of shoes, the band axially positionable away from the first set of flange segments and the second set of flange segments, the band exerting a radially inward compressive force on a position around the circumference of the rim portion to retain the band thereon, the band is sufficiently secure to the rim portion to provide axial pressure to a first bead of a tire; and a belt positioned around the rim portion, the belt having a width equal to the original rim width of the rim segment and the belt configured to form a sealing contact with the first bead and a second bead of the tire to allow air to be filled and retained within the tire;

wherein the band defines an adjusted rim width between a band inward facing surface of the band and an inward facing surface of the second set of flange segments, the adjusted rim width is less than the original rim width.

10. The machine of claim 9, wherein the band is a first band, the machine further comprising:

a second band positioned around the circumference of the rim segments of the plurality of shoes, the second band axially positionable between the first band and the second set of flange segments, the second band exerting a radially inward compressive force on the position around the circumference of the rim portion to retain the second band thereon, the band sufficiently secure to the rim portion to provide axial pressure to the second bead;

wherein the first band and the second band define the adjusted rim width.

11. The machine of claim 9, wherein the band extends from adjacent a top surface of the flange segment to a drum surface of the expandable rim.

12. The machine of claim 9, wherein the band is formed from a stretchable material.

13. The machine of claim 9, wherein the belt is disposed along the rim segment of the plurality of shoes between a drum surface of the expandable rim and the band.

14. The machine of claim 13, wherein the band extends from adjacent a top surface of the flange segment to an outer surface of the belt.

15. A method comprising:

assembling a plurality of shoes to form a cylindrical rim structure of an expandable rim, each of the plurality of shoes including a rim segment, a first flange segment on a first side of the rim segment and a second flange segment on a second side of the rim segment opposite the first side, the rim segment defining an original rim width measured between inward facing surfaces of the first flange segment and the second flange segment;

positioning a band having a rectangular cross-section around a circumference of the cylindrical rim structure to contact an inward surface of the first flange segment, the band exerting a radially inward compressive force on the position around the circumference of the rim portion to retain the band thereon, the band biased toward the first flange segment by a first bead of the tire when the tire is filled with air; and positioning a belt around a circumference of the cylindrical rim structure, the belt having a width equal to the original rim width of the rim segment and the belt configured to form a sealing contact with the first bead and a second bead of the tire to allow air to be filled and retained within the tire;

wherein the expandable rim has an adjusted rim width measured between a band inward facing surface of the band and an inward facing surface of the second flange segment, the inward facing surface of the second flange segment configured to interface with the second bead of the tire when the tire is filled with air, the adjusted rim width less than the original rim width.

16. The method of claim 15, wherein the band is a first band, the method further comprising:

positioning a second band around the circumference of the cylindrical rim structure opposite the first band and adjacent the second flange segment, the second band adjacent to and contacting an inward surface of the second flange segment, the second band exerting a radially inward compressive force on the position around the circumference of the rim portion to retain the second band thereon, wherein the adjusted rim width is measured between a first band inward facing surface of the first band and a second band inward facing surface of the second band.

17. The method of claim 15 further comprising:

expanding a diameter of the cylindrical rim structure of the expandable rim.

18. The method of claim 15, wherein the band is formed from a stretchable material.

19. The method of claim 15, wherein the band is a first band and the adjusted rim width is a first adjusted rim width, the method further comprising:

positioning a second band around the circumference of the cylindrical rim structure between the first band and the second set of flange segments, the second band configured to interface with the first bead and configured to be biased toward the first band when the tire is filled with air;

wherein the expandable rim has a second adjusted rim width measured between a second band inward facing surface of the second band and an inward facing surface of the second set of flange segments, the second adjusted rim width less than the first adjusted rim width.

* * * * *